United States Patent
Kim et al.

(10) Patent No.: US 7,432,607 B2
(45) Date of Patent: Oct. 7, 2008

(54) POWER GENERATION PAD USING WASTED ENERGY

(76) Inventors: Richard H. Kim, 1450 S. Havana St., Suite 312, Aurora, CO (US) 80012; Bobby Kim, 1450 S. Havana St., Suite 312, Aurora, CO (US) 80012; Mike S. Kim, 1450 S. Havana St., Suite 312, Aurora, CO (US) 80012; Debra Y. Kim, 1450 S. Havana St., Suite 312, Aurora, CO (US) 80012

( * ) Notice: Subject to any disclaimer, the term of this patent is extended or adjusted under 35 U.S.C. 154(b) by 0 days.

(21) Appl. No.: 11/636,888

(22) Filed: Dec. 11, 2006

(65) Prior Publication Data

US 2007/0257495 A1 Nov. 8, 2007

Related U.S. Application Data

(60) Provisional application No. 60/798,704, filed on May 8, 2006.

(51) Int. Cl.
*H02K 39/00* (2006.01)
(52) U.S. Cl. .................................................. 290/1 R
(58) Field of Classification Search ................. 290/1 R
See application file for complete search history.

(56) References Cited

U.S. PATENT DOCUMENTS

| | | | |
|---|---|---|---|
| 159,660 A | 2/1875 | Faivre | |
| 2,020,361 A | 11/1935 | Johnston | |
| 3,885,163 A | 5/1975 | Toberman | |
| 4,212,598 A | 7/1980 | Roche et al. | |
| 4,238,687 A | 12/1980 | Martinez | |
| 4,250,395 A | 2/1981 | Lundgren | |
| 4,339,920 A | 7/1982 | Le Van | |
| 4,418,542 A | 12/1983 | Ferrell | |
| 4,437,015 A | 3/1984 | Rosenblum | |
| 4,500,827 A * | 2/1985 | Merritt et al. | 322/3 |
| 4,614,875 A | 9/1986 | Mc Gee | |
| 4,739,179 A | 4/1988 | Stites | |
| 5,347,186 A * | 9/1994 | Konotchick | 310/17 |
| 5,818,132 A * | 10/1998 | Konotchick | 310/17 |
| 6,091,159 A | 7/2000 | Galich | |
| 6,172,426 B1 | 1/2001 | Galich | |
| 6,204,568 B1 | 3/2001 | Runner | |
| 6,376,925 B1 | 4/2002 | Galich | |
| 6,734,575 B2 | 5/2004 | Ricketts | |
| 6,756,694 B2 | 6/2004 | Ricketts | |
| 6,936,932 B2 | 8/2005 | Kenney | |
| 7,102,244 B2 * | 9/2006 | Hunter, Jr. | 290/1 R |
| 2003/0034652 A1 * | 2/2003 | Slatkin | 290/1 R |

* cited by examiner

FOREIGN PATENT DOCUMENTS

WO WO 9516133 A1 * 6/1995

*Primary Examiner*—Joseph Waks
(74) *Attorney, Agent, or Firm*—Craig Barber; Barber Legal

(57) ABSTRACT

An energy generator comprising a generally flat and partially flexible traffic surface on which pedestrians and traffic may pass. Underneath the traffic surface, a plurality of dynamo cells each have a dynamo therein, each dynamo having two electricity generating elements (magnets, coils, etc) and an operative electrical connection to an electrical load such as a battery, capacitor, light, an electrical network or the like. A first electrical generating element in each dynamo may be disposed so that it moves downward when weight from traffic is applied to the traffic surface, while a second electricity generating element remains stationary, supported by the bottom surface of the energy generator. A spring and bottom support may urge the first (moving) element back upwards when the imposed force is released.

8 Claims, 8 Drawing Sheets

FIG·2

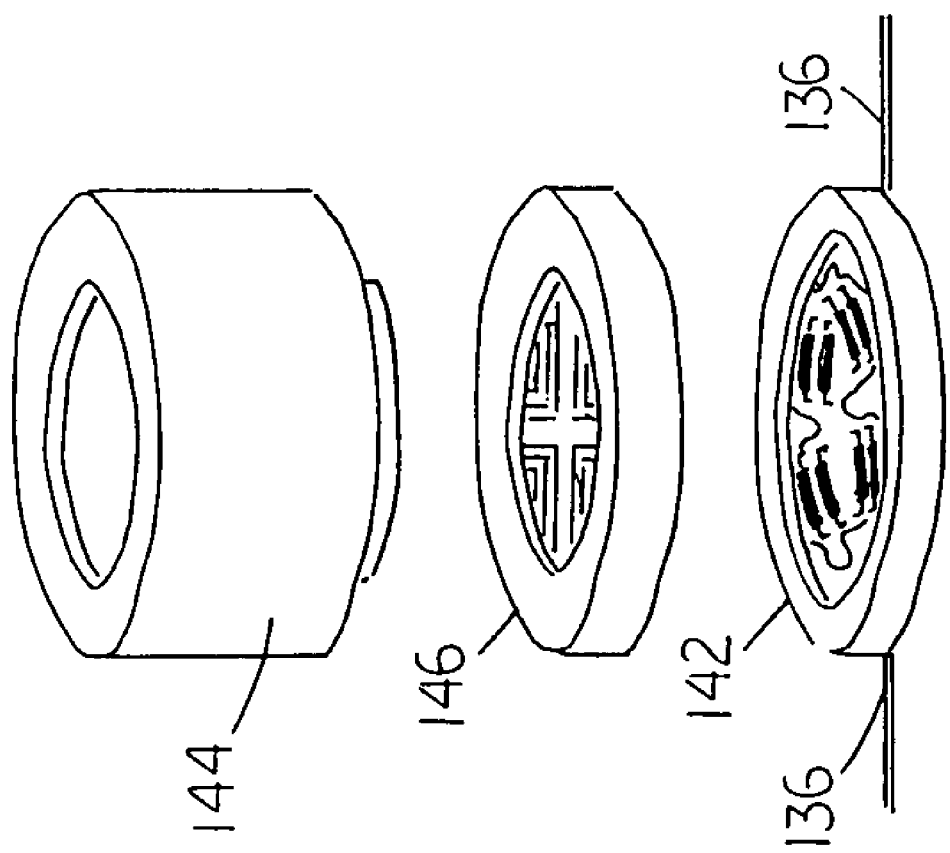

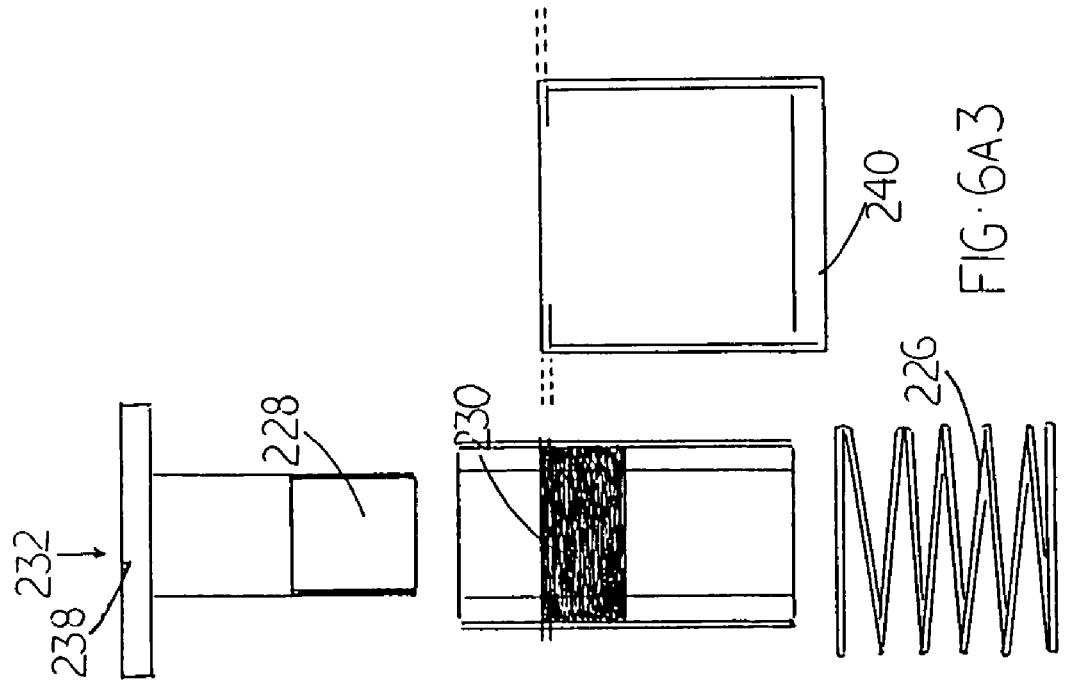
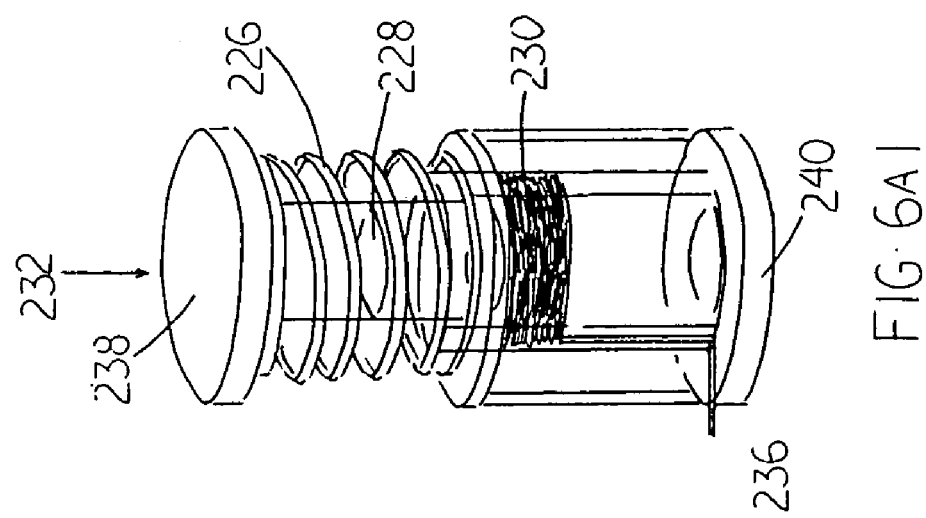
FIG. 6A1

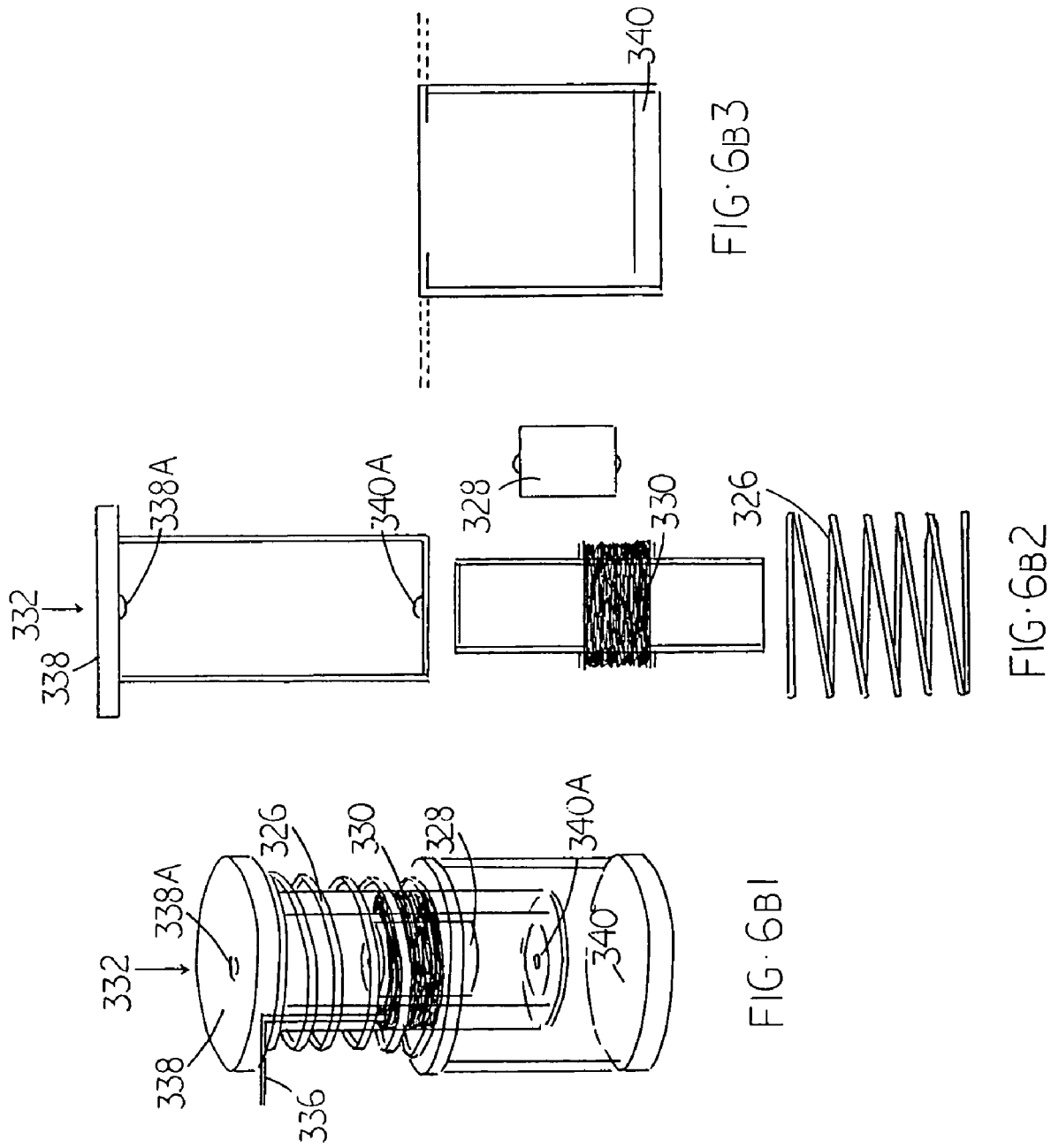

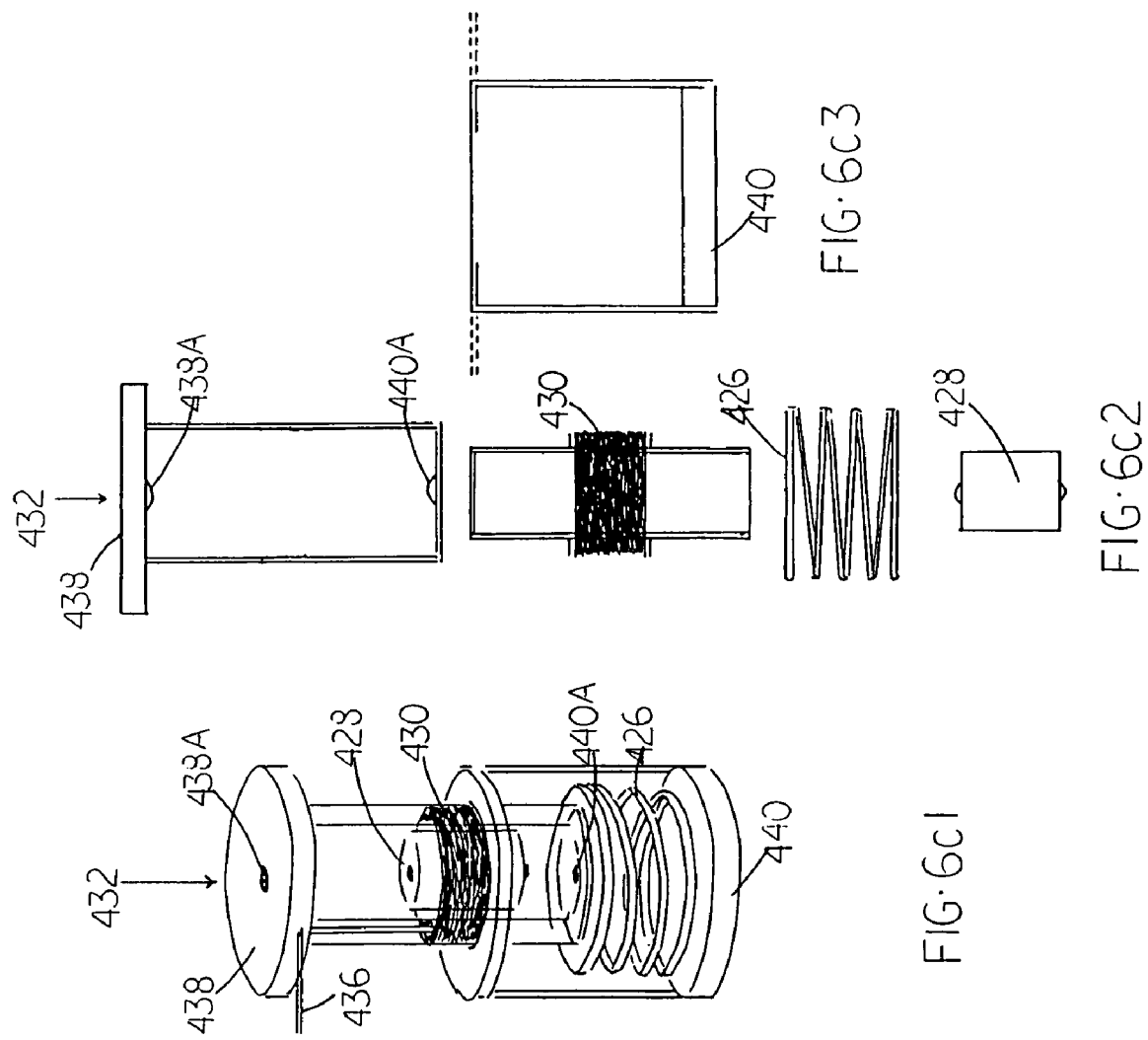

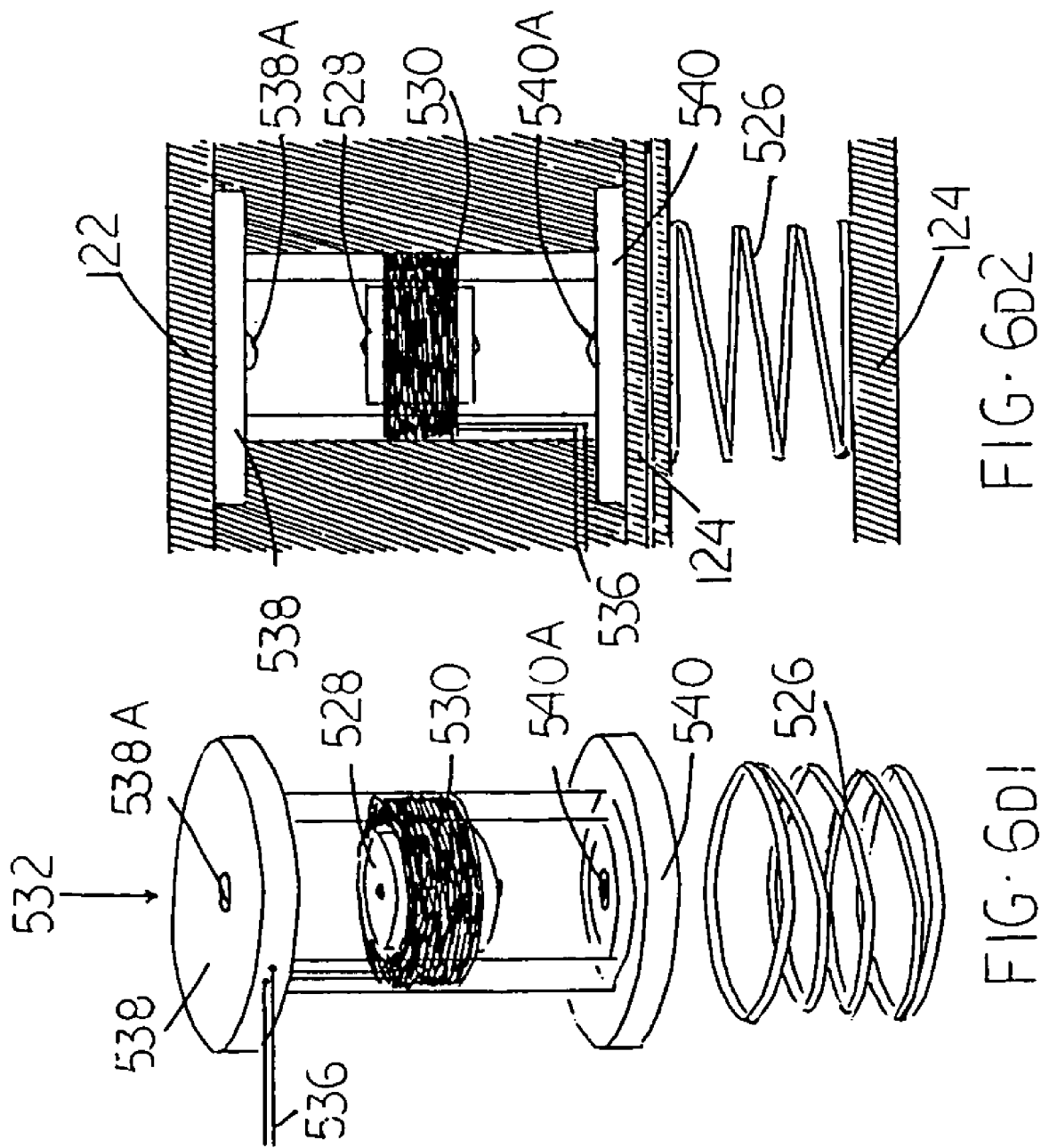

US 7,432,607 B2

POWER GENERATION PAD USING WASTED ENERGY

CROSS-REFERENCE TO RELATED APPLICATIONS

The application claims the priority and benefit of U.S. Provisional Patent Application No. 60/798,704 filed May 8, 2006 in the name of the same inventors, and entitled WASTING ENERGY RECYCLE POWER GENERATING PAD the entire specification of which is incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

FIELD OF THE INVENTION

This invention relates generally to energy generation devices, and specifically to waste energy recycling devices.

STATEMENT REGARDING FEDERALLY FUNDED RESEARCH

This invention was not made under contract with an agency of the US Government, nor by any agency of the US Government.

BACKGROUND OF THE INVENTION

Due to an imbalance between energy usage and energy demand, the development of alternative energy supplies and the development of energy recycling devices will become increasingly important in the near future. Various types of alternative energy sources are under investigation: nuclear energy, solar power (both photovoltaic and thermodynamic), wind energy, tidal energy, wave energy, geothermal energy, biomass, biofuels, and so on. The United States has claimed plans to generate 10% of total energy consumption by the year 2010, while other nations are already using such energy sources to provide large percentages of their energy needs.

In general, most energy in the US is produced using coal power at the present time. The highly polluting nature of coal energy is well known, less well known is the immense carnage that the "Black Lung" disease inflicts among coal miners exposed to coal dust for long periods: Black Lung kills coal miners in large numbers.

Hydropower and wind power both hold promise as relatively speaking "clean" sources of energy, however, even wind energy farms kill countless birds every years, while suitable locations for hydropower (dams) are frustratingly limited.

Another avenue for energy generation is the recycling/regeneration of waste energy into usable energy.

Examples of attempts to provide recycling of waste energy date back at least as far as U.S. Pat. No. 159,660 issued Feb. 9, 1875 in the name of Faivre, and include numerous more recent items. However, most of these schemes involve devices which are either inefficient at producing energy or are excessively complex. One example of the inefficiencies of such systems is the relatively course grain of the sections of ground which move to generate electricity.

Methods and devices for recycling/regeneration of waste energy into usable energy will be at the forefront in providing solutions to the energy problems of the present and near future.

One method of generating electricity uses the reserve energy from human bodies as they walk or run from place to place. In particular, as a person moves, the energy from foot impact on the ground followed by pushing the foot off of the ground, and the energy of the weight of a human body resting momentarily on one place and then moving on, all combine to provide a source of energy, to the surface over which the person passes. However, in order to generate power, it is necessary for motion of the surface to occur.

It would be advantageous to provide a fine grained, cellular system for allowing energy generation from passage of human beings.

In particular, the energy wasted in the passage of human beings from place to place offers unlimited potential and almost unlimited possibilities for recycling otherwise wasted human energy.

It would be advantageous to provide a method of recycling wasted human energy which could be applied in almost unlimited locations.

SUMMARY OF THE INVENTION

General Summary

The present invention uses the energy wasted in the passage of human beings and/or vehicular traffic from place to place to offer a new concept having unlimited potential and almost unlimited possibilities for recycling otherwise wasted human energy which could be applied in almost unlimited locations. This alternative energy source could be in the forefront of renewable solutions to energy supply problems. The present invention teaches an energy generator comprising a generally flat and partially flexible traffic surface on which pedestrians and traffic may pass. The traffic surface may be flat, grooved, waved, patterned and so on in order to fit the locale or provide the most efficient traction. Underneath the traffic surface, a plurality of dynamo cells each have a dynamo therein, each dynamo having two electricity generating elements (magnets, coils, etc) and an operative electrical connection to an electrical load such as a battery, capacitor, light, an electrical network or the like. A first electrical generating element in each dynamo may be disposed so that it moves downward when weight from traffic is applied to the traffic surface, while a second electricity generating element remains stationary, supported by the bottom surface of the energy generator. A spring and bottom support may urge the first (moving) element back upwards when the imposed force is released.

The present invention teaches that a large plurality of spring based dynamos may be provided under a slightly moving surface so that when an individual's foot falls on an individual dynamo, that unit may generate electricity.

Any source of motion may be used: pedestrian or vehicular traffic, or other reasonably predictable imposed loads such as individuals engaged in sporting activities or the like. The size of the individual cells of the device may be easily scaled up or down depending upon the loads expected.

As the device of the invention is a self contained energy generation system, it may advantageously be employed at locations having traffic but no source of electrical supply, for example, at remote countryside intersections. However, it may also be used at densely populated urban locations, and may be hooked to the electrical grid as a power source.

Structurally, the individual dynamo device of the invention, which comprises one cell of the overall device, is a spring loaded, vertically oriented coil and armature in which one of the coil or armature is secured to the underlying immovable substrate while the other of the armature or coil is attached to the moving surface so that the two move in relation to each other when a load is imposed. Circuitry allows the device to then provide the energy generated to a storage device such as a battery, capacitor or the like, or to carry out useful work such as providing lighting or pumping, or to feed an electrical grid as an electricity source.

SUMMARY IN REFERENCE TO CLAIMS

It is therefore another aspect, advantage, objective and embodiment of the invention, in addition to those discussed in previous sections and in the detailed description and shown in the diagrams, to provide an energy generator comprising:
  a body having a top and bottom, the top partially flexible, the bottom inflexible, and a plurality of dynamo cells disposed between the top and the bottom;
  each dynamo cell having a first electricity generating element disposed adjacent the top of the body so that when the partially flexible top distends downward, the first electricity generating element is moved downward from a first position to a second position;
  each dynamo cell further having a second electricity generating element disposed adjacent the bottom of the body so that when the first electricity generating element moves downward, the second electricity generating element does not move downward;
  each of the electricity generating elements being one member selected from the group consisting of: coils, magnets, electromagnets, armatures, and combinations thereof; wherein
  the first and second electricity generating elements are disposed in magnetic communication with each other so that during relative motion of the two elements, an electrical current is generated in one of the electricity generating elements.

It is therefore a second aspect, advantage, objective and embodiment of the invention to provide an energy generator further comprising: wherein each dynamo cell further comprises:
  a first spring disposed so as to urge the first electricity generating element into the first position.

It is therefore another aspect, advantage, objective and embodiment of the invention to provide an energy generator further comprising: wherein the flexible top of the body reflexively urges the first electricity generating element into the first position.

It is therefore another advantage, objective, aspect and embodiment of the invention to provide an energy generator further comprising: wherein the inflexible bottom comprises at least one member selected from the group consisting of:
  sidewalk, paving, tarmac, road, metal plate, stone, wood, polymer and combinations thereof.

It is therefore another aspect, advantage, objective and embodiment of the invention to provide an energy generator further comprising: wherein the flexible top comprises a flexible polymer material.

It is therefore yet another aspect, advantage, objective and embodiment of the invention to provide an energy generator further comprising:
  a bottom support having a top surface, a bottom surface and an aperture passing through the top surface;
  the bottom surface of the bottom support in turn supported on the inflexible bottom of the body;
  the bottom support top surface dimensioned and configure to support the first spring at a lower end of the first spring;
  the aperture dimensioned and configured to allow at least one of the electricity generating elements to pass therethrough.

It is therefore another aspect, advantage, objective and embodiment of the invention to provide an energy generator further comprising:
  a bottom support having a top surface, a bottom surface and an aperture passing through the top surface;
  the bottom surface of the bottom support in turn supported on the inflexible bottom of the body;
  the bottom support bottom surface dimensioned and configure to support the first spring at a lower end of the first spring;
  the aperture dimensioned and configured to allow at least one of the electricity generating elements to pass therethrough, the electricity generating element passing through the aperture in turn resting upon an upper end of the first spring.

It is therefore yet another objective, aspect, advantage and embodiment of the invention to provide an energy generator wherein the first and second electricity generating elements move freely in relation to one another without damping.

It is therefore another aspect, advantage, objective and embodiment of the invention to provide a method of generating electricity comprising the steps of:
  a) providing an energy generator having a partially flexible traffic surface having a plurality of dynamo cells disposed thereunder, each dynamo cell having therein one dynamo, each dynamo having a first electricity generating element fixed so as to move when the partially flexible traffic surface flexes downwards and having a second electricity generating element fixed so as not to move;
  b) emplacing the energy generator at a location selected for having traffic;
  c) operatively electrically connecting the energy generator to an electrical load; and
  c) allowing traffic to pass across the energy generator.

BRIEF DESCRIPTION OF THE DRAWINGS

FIG. 5 is an exploded view of a storage battery.

FIG. 6a1 is a transparent view of a third embodiment of one individual dynamo of the invention.

FIG. 6a2 is a cross-sectional side exploded view of the third embodiment dynamo of the invention.

FIG. 6a3 is a cross-sectional side view of the bottom support of the third embodiment dynamo of the invention.

FIG. 6b1 is a transparent view of a fourth embodiment of one individual dynamo of the invention.

FIG. 6*b*2 is a cross-sectional side exploded view of the fourth embodiment dynamo of the invention, with the magnet removed to one side.

FIG. 6*b*3 is a cross-sectional side view of the bottom support of the fourth embodiment dynamo of the invention.

FIG. 6*c*1 is a transparent view of a fifth embodiment of one individual dynamo of the invention.

FIG. 6*c*2 is a cross-sectional side exploded view of the fifth embodiment dynamo of the invention.

FIG. 6*c*3 is a cross-sectional side view of the bottom support of the fifth embodiment dynamo of the invention.

FIG. 6D1 is a transparent view of a sixth embodiment of one individual dynamo of the invention.

FIG. 6D2 is a cross-sectional side exploded view of the sixth embodiment dynamo of the invention.

Figure 2:
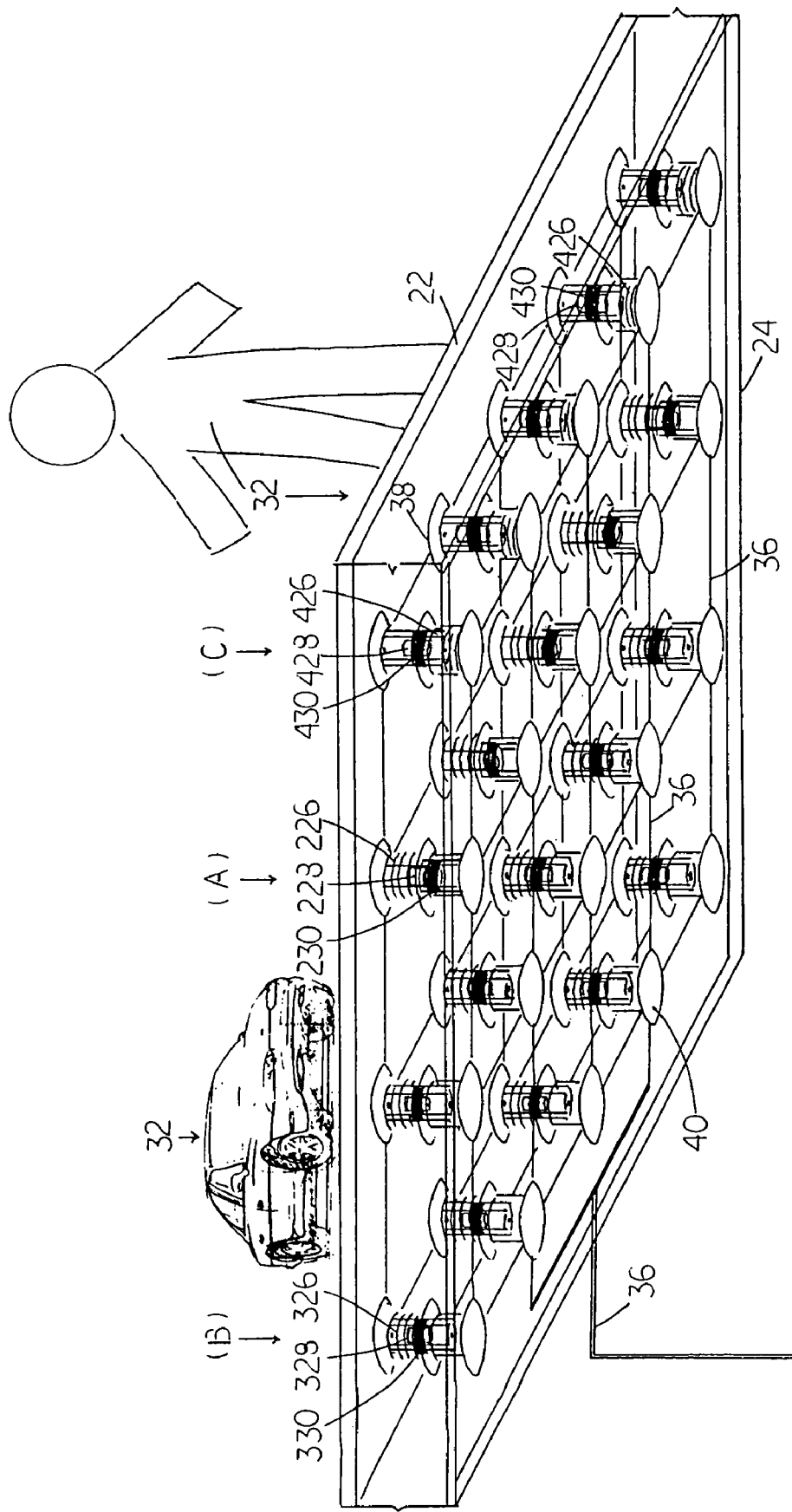
FIG. 2 is a low-angle perspective partially disassembled diagram of the first embodiment of the device, showing working of individual cells.

| INDEX OF REFERENCE NUMERALS | |
|---|---|
| Dynamo type A | A |
| Dynamo type B | B |
| Dynamo type C | C |
| Section line to FIG. 2 | 2 |
| Section line to FIG. 6a | 6a |
| Section line to FIG. 6b | 6b |
| Section line to FIG. 6c | 6c |
| Energy generator | 20 |
| Partially flexible top surface | 22 |
| Bottom surface | 24 |
| Spring | 26 |
| Magnet | 28 |
| Coil | 30 |
| Traffic | 32 |
| Electrical connection/ electrical connection to load | 36 |
| Plunger head | 38 |
| Bottom support | 40 |
| Energy Generator | 120 |
| Partially flexible top surface | 122 |
| Bottom surface | 124 |
| Electrical connection/ electrical connection to load | 136 |
| Plunger head | 138 |
| Bottom support | 140 |
| Control circuitry | 142 |
| Battery | 144 |
| Battery circuit panel | 146 |
| Spring | 226 |
| Magnet | 228 |
| Coil | 230 |
| Traffic imposed forces | 232 |
| Electrical connection/ electrical connection to load | 236 |
| Plunger head | 238 |
| Bottom support | 240 |
| Spring | 326 |
| Magnet | 328 |
| Coil | 330 |
| Traffic weight | 332 |
| Electrical connection/ electrical connection to load | 336 |
| Plunger head | 338 |
| Repulsion Magnets | 338A, 340A |
| Bottom support | 340 |
| Spring | 426 |
| Magnet | 428 |
| Coil | 430 |
| Traffic/traffic imposed weight | 432 |
| Electrical connection/ electrical connection to load | 436 |
| Plunger head | 438 |
| Repulsion magnets | 438A, 440A |
| Bottom support | 440 |
| Spring | 526 |
| Magnet | 528 |
| Coil | 530 |
| Traffic imposed weight | 532 |

-continued

| INDEX OF REFERENCE NUMERALS | |
|---|---|
| Electrical connection/ electrical connection to load | 536 |
| Plunger head | 538 |
| Repulsion Magnets | 538A, 540A |
| Bottom support | 540 |

DETAILED DESCRIPTION

Figure 1:
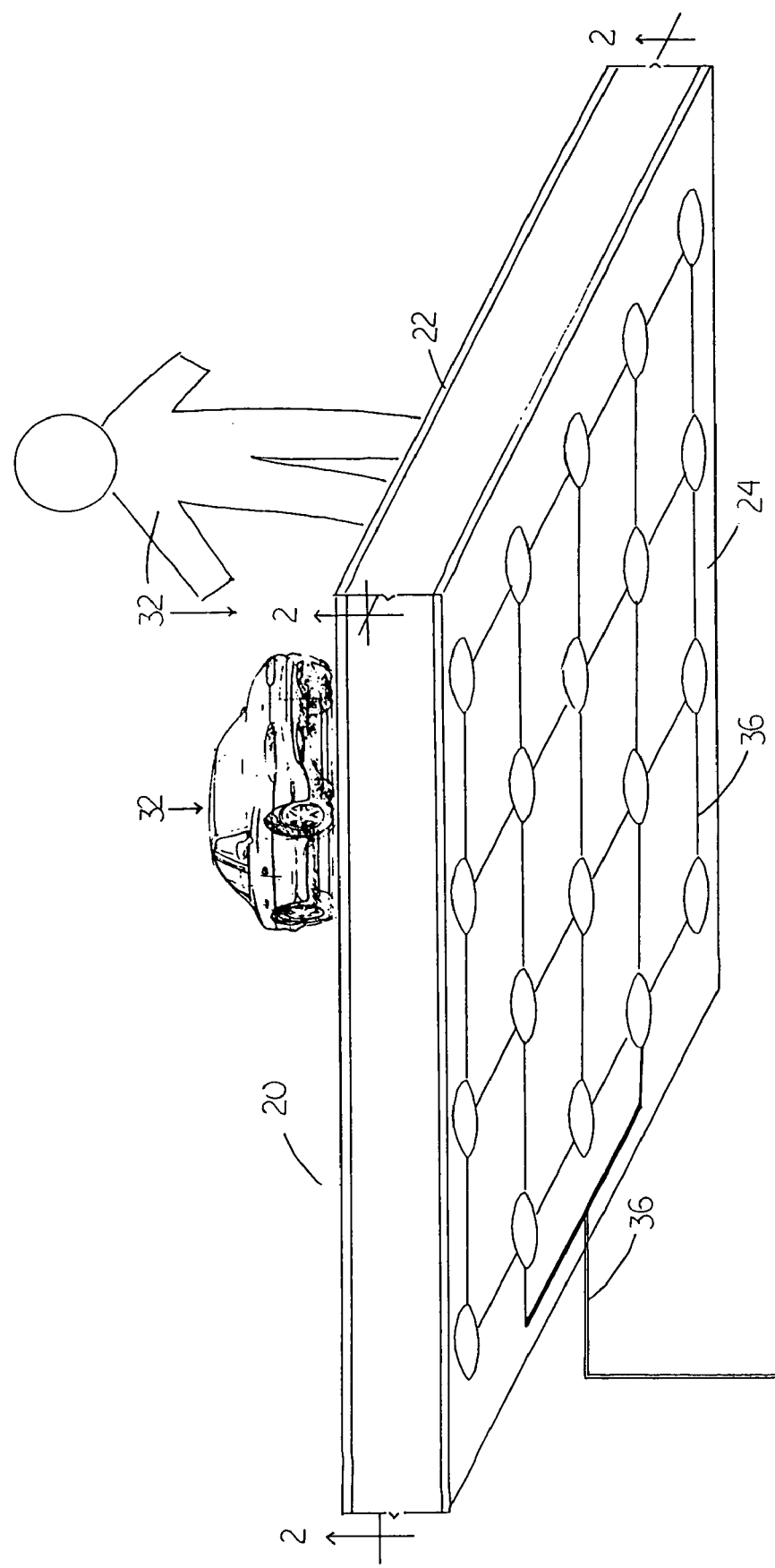
FIG. 1 is a low-angle perspective diagram of a first embodiment of the device.

FIG. 1 is a low-angle perspective diagram of a first embodiment of the energy generation device 20. Partially flexible top surface 22 is a traffic surface on which traffic 32, pedestrian or vehicular, may pass. It may be flat, bumpy, waved, grooved, patterned, or combinations thereof. Bottom surface 24 may be an inflexible material such as sidewalk, paving, tarmac, road, street, highway, intersection, metal plate, stone, wood, polymer and combinations thereof and in any location in which people or vehicles regularly pass. Thus the device may be made as a retrofit to sidewalks and streets, or it may be built integral with the street, and it may be even be a portable pad which may be temporarily placed in one location before being moved to another location.

Electrical connection/electrical connection to load 36 may be standard wiring which connects dynamo cells as required or/and which connects the device to an electrical load such as a light, an emergency telephone, a sign, an electrical power grid, a battery, capacitor and so on.

FIG. 2 is a low-angle perspective partially disassembled diagram of the first embodiment of the device, showing working of individual cells. Energy generator 20 may have partially flexible top surface 22 (a tough polymer or similar material, or a hard surface having only local flexibility) as well as rigid bottom surface 24.

Spring 26 in each dynamo may urge one of the electricity generating elements (magnet 28, coil 30, or the like) upwards whenever the weight of traffic 32 is not present, but may allow the weight of the pedestrian, car, sports player, student, etc to push that same electricity generating element downward from a first relaxed or normal position to a second lower position. Plunger head 38 may be part of the top surface 22 or may be just underneath, with the first, moving electricity generating element attached thereto, or the element may be attached directly to the top surface 22, or the plunger head 38 may be integrated into the top surface 22 as part thereof.

Bottom support 40 may sit upon an underlying sidewalk or street, or may be part thereof. Second electricity generating elements will be held in place by the bottom supports, and will be held in operative magneto-electrical communication so that relative motion of one element with respect to the other will generate electrical currents in one element or the other, usually a coil.

Figure 3:
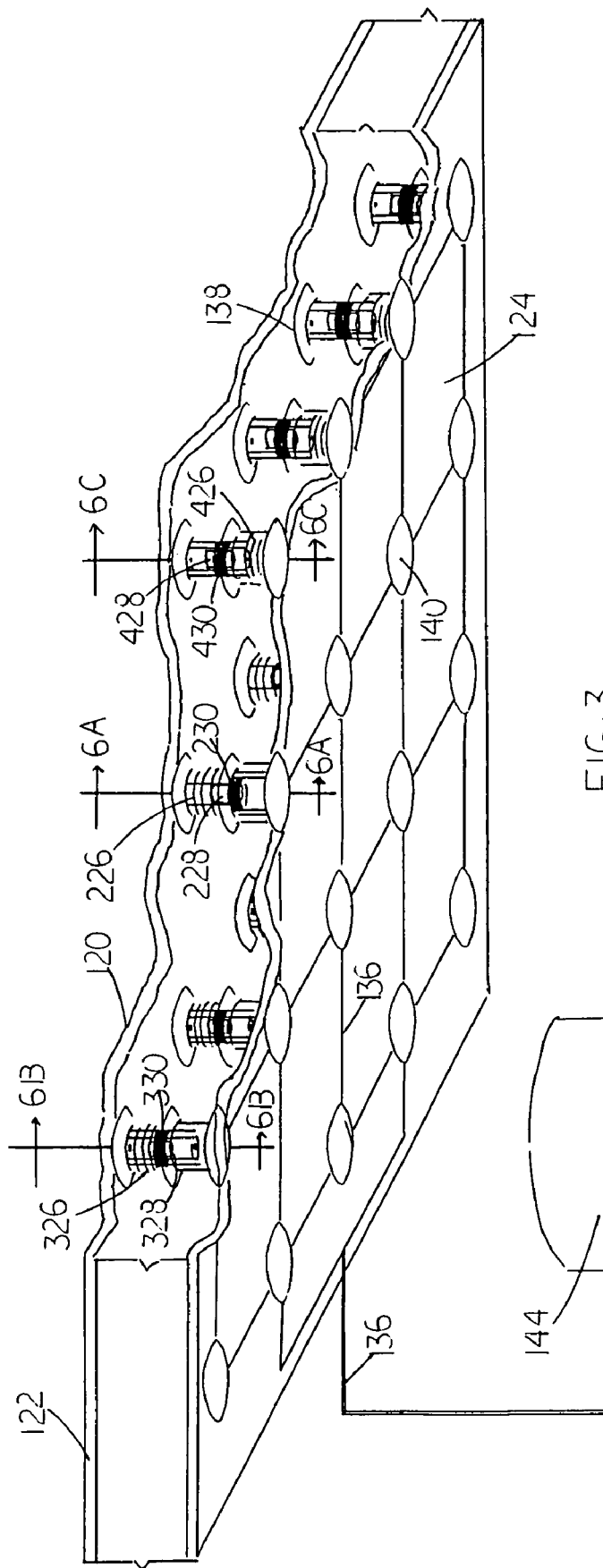
FIG. 3 is a partially cross-sectional low-angle perspective diagram of a second embodiment of the device.
Figure 4:
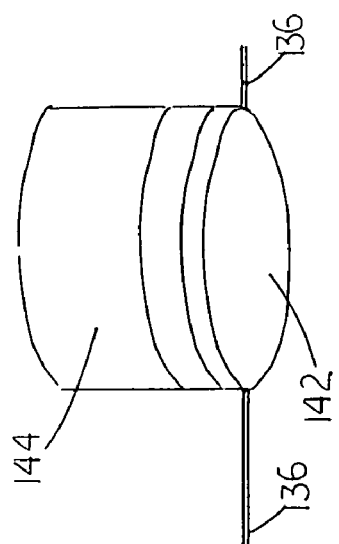
FIG. 4 is a block diagram of a storage battery connected to the device.

FIG. 3 is a partially cross-sectional low-angle perspective diagram of a second embodiment of the device. It may be clearly seen in this embodiment that the individual dynamos of the dynamo cells may be of differing construction. FIG. 4 is a block diagram of a storage battery connected to the device. FIG. 5 is an exploded view of a storage battery.

Energy generator 120 once again has partially flexible top surface 122, bottom surface 124, spring 126, magnet 128, coil 130, plunger heads 138, bottom support 140, and a network of electrical connections and connections to load, 136.

Control circuitry 142 may be disposed in the load, which may be battery 144 having battery circuit panel 146 or may be in the generation device 120 itself, or in embodiments may be omitted if practicable.

The FIG. 6 in general show that the construction of the individual dynamos may vary.

FIG. 6a1 is a transparent view of a third embodiment of one individual dynamo of the invention. FIG. 6a2 is a cross-sectional side exploded view of the third embodiment dynamo of the invention. FIG. 6a3 is a cross-sectional side view of the bottom support of the third embodiment dynamo of the invention. Spring 226 sits atop bottom support 240's top surface, both spring and support co-axial with the axis of the dynamo and the aperture passing through the top surface of the bottom support 240. Magnet 228 may freely pass through the aperture when top plunger 238 moves, while coil 230 is fixed within bottom support 240 when imposed weight of traffic 232 depresses parts of the dynamo unit. Electrical connection 236 may be standard wiring.

It will be appreciated that in embodiments, it may be desirable to prevent free, undamped motion of the magnet 228, and this embodiment accomplishes that. However, in the preferred embodiments, electricity generating elements may vibrate in relation to one another so as to provide additional electricity generation, and this is shown in FIGS. 6b and 6c.

FIG. 6b1 is a transparent view of a fourth embodiment of one individual dynamo of the invention. FIG. 6b2 is a cross-sectional side exploded view of the fourth embodiment dynamo of the invention, with the magnet removed to one side. FIG. 6b3 is a cross-sectional side view of the bottom support of the fourth embodiment dynamo of the invention.

In this embodiment, spring 326 sits atop bottom support 240's top surface once again, and bottom support 240 in turn has a bottom surface of the bottom support which sits on the bottom surface (24, for example) of the body of the generation device. Magnet 328 may be seen (shown removed from the interior of the plunger for clarity) to fit inside of the downward cylindrical extension portion of plunger head 338 and the cylindrical portion of coil 330. Magnets 338A and 340A are fixed magnets (not traveling) which are repulsion magnets to repel the magnet 328 and cause it to continue traveling. Coil 330 in turn sits inside of spring 326. Thus, unlike the embodiment of FIG. 6a, in this embodiment the coil cylinder is fixed above the aperture of the top surface of the bottom support 240, rather than within the bottom support 240. More importantly, the, magnet 328 vibrates in relation to the coil, producing extra energy as the spring or flexible top 22 returns the device to the first position after traffic 332 passes over, and also in any elastic rebounds which may occur even after that.

In the presently preferred embodiment and best mode presently contemplated for carrying out the invention, the magnet is even more free to vibrate. It is believed that on streets which themselves vibrate from passing traffic, more energy can be generated this way. Even if this is not correct, more energy can still be generated as a freely moving magnet having no damping will continue to move against the action of the spring for a moment after being stepped on and released, thus generating more energy than otherwise. This is shown in the embodiments of FIG. 6c. FIG. 6c1 is a transparent view of a fifth embodiment of one individual dynamo of the invention. FIG. 6c2 is a cross-sectional side exploded view of the fifth embodiment dynamo of the invention. FIG. 6c3 is a cross-sectional side view of the bottom support of the fifth embodiment dynamo of the invention.

Spring 426 may be disposed inside of bottom support 240, in the cylindrical or otherwise shaped interior of the support, between the bottom support 240 top and bottom surfaces. The aperture at the top surface allows the cylindrical portion of the plunger head 438 to pass therethrough, and magnet 428 may actually vibrate within coil 430 all the way from the head portion of the plunger 438 to the top of the spring 426, a spring plate. Magnets 438A, 440A are fixed magnets and will repel magnet 428 as it moves. Traffic 432 may thus continue to provide electricity after releasing its weight off of the dynamo device (such as when a person steps away) or when otherwise vibrated (for example if a large truck passes close by, even if it does not depress the dynamo itself). Electrical connections/network 436 may be rerouted onto the cylindrical portion of the plunger, onto the plunger head, the cylindrical portion of the coil, the cylindrical portion of the bottom support, etc, etc.

FIG. 6D1 is a transparent view of a sixth embodiment of one individual dynamo of the invention, while FIG. 6D2 is a cross-sectional side exploded view of the sixth embodiment dynamo of the invention.

Spring 526 sits in a multi-layered bottom surface 124, and supports the entire dynamo unit. Thus, under imposed weight loads of traffic 532, all of the components are free to vibrate, including magnet 528, coil 530, electrical connection 536, plunger head 538, magnets 538A, 540A, and even the bottom support 540, which in effect becomes part of 124.

While the structure of FIG. 6C1 is completely split apart, that of FIG. 6D1 is put together, though similar energy generation functions are achieved by the two different structures.

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. An energy generator comprising:
a body having a top and bottom, the top partially flexible, the bottom inflexible, and a plurality of dynamo cells disposed between the top and the bottom;
each dynamo cell having a first electricity generating element disposed adjacent the top of the body so that when the partially flexible top distends downward, the first electricity generating element is moved downward from a first position to a second position;
each dynamo cell further having a second electricity generating element disposed adjacent the bottom of the body so that when the first electricity generating element moves downward, the first electricity generating element moves relative to the second electricity generating element;
each of the electricity generating elements being one member selected from the group consisting of: coils, magnets, electromagnets, armatures, and combinations thereof;
a bottom support having a top surface, a bottom surface and an aperture passing through the top surface;
the bottom surface of the bottom support in turn supported on the inflexible bottom of the body;
the bottom support bottom surface dimensioned and configure to support the first spring at a lower end of the first spring;
the aperture dimensioned and configured to allow at least one of the electricity generating elements to pass therethrough, the electricity generating element passing through the aperture in turn resting upon an upper end of the first spring;

wherein
the first and second electricity generating elements are disposed in magnetic communication with each other so that during relative motion of the two elements, an electrical current is generated in one of the electricity generating elements.

2. The energy generator of claim 1, wherein each dynamo cell further comprises:
a first spring disposed so as to urge the first electricity generating element into the first position.

3. The energy generator of claim 2, further comprising:
a bottom support having a top surface, a bottom surface and an aperture passing through the top surface;
the bottom surface of the bottom support in turn supported on the inflexible bottom of the body;
the bottom support top surface dimensioned and configure to support the first spring at a lower end of the first spring;
the aperture dimensioned and configured to allow at least one of the electricity generating elements to pass therethrough.

4. The energy generator of claim 2, wherein the first and second electricity generating elements move freely in relation to one another without damping.

5. The energy generator of claim 1, wherein the flexible top of the body reflexively urges the first electricity generating element into the first position.

6. The energy generator of claim 1, wherein the inflexible bottom comprises at least one member selected from the group consisting of:
sidewalk, paving, tarmac, road, metal plate, stone, wood, polymer and combinations thereof.

7. The energy generator of claim 1, wherein the flexible top comprises a flexible polymer material.

8. An energy generator comprising:
a body having a top and bottom, the top partially flexible, the bottom inflexible, and a plurality of dynamo cells disposed between the top and the bottom;
each dynamo cell having a first electricity generating element disposed adjacent the top of the body so that when the partially flexible top distends downward, the first electricity generating element is moved downward from a first position to a second position;
each dynamo cell further having a second electricity generating element disposed adjacent the bottom of the body so that when the first electricity generating element moves downward, the second electricity generating element moves differently;
a bottom support having a top surface and a bottom surface;
the bottom surface of the bottom support in turn supported on the inflexible bottom of the body;
the inflexible bottom of the body in turn supported upon the first spring each of the electricity generating elements being one member selected from the group consisting of: coils, magnets, electromagnets, armatures, and combinations thereof;
wherein
the first and second electricity generating elements are disposed in magnetic communication with each other so that during relative motion of the two elements, an electrical current is generated in one of the electricity generating elements.

\* \* \* \* \*